June 2, 1964
L. W. MURPHY ETAL
3,135,017
METHOD OF PREPARING ANIMALS FOR SLAUGHTER
Filed Aug. 30, 1960
4 Sheets-Sheet 1
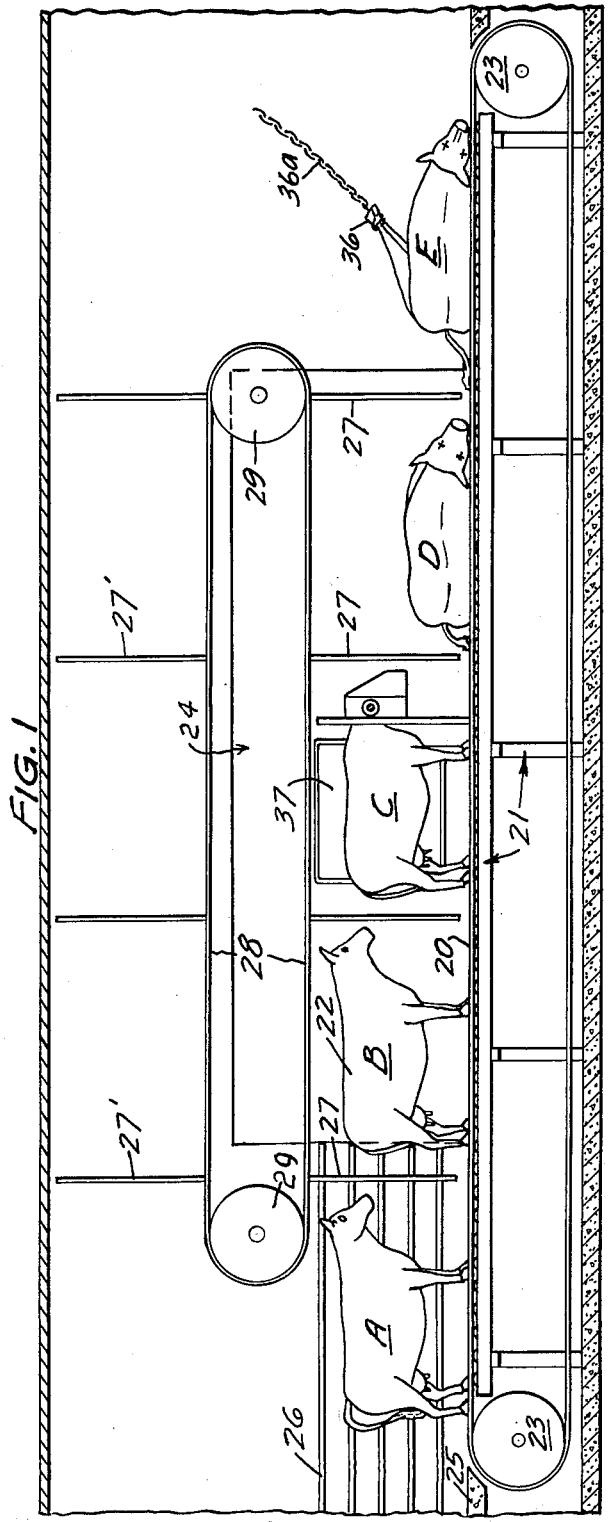
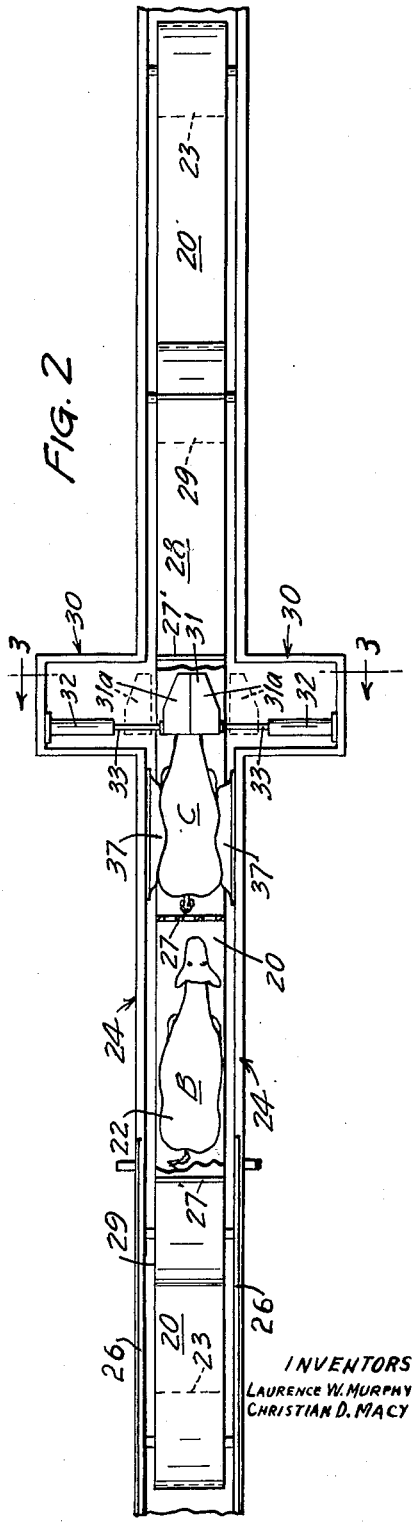
INVENTORS
LAURENCE W. MURPHY
CHRISTIAN D. MACY June 2, 1964 L. W. MURPHY ETAL 3,135,017
METHOD OF PREPARING ANIMALS FOR SLAUGHTER
Filed Aug. 30, 1960 4 Sheets-Sheet 2
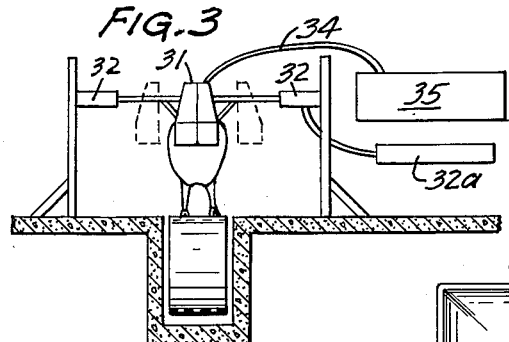
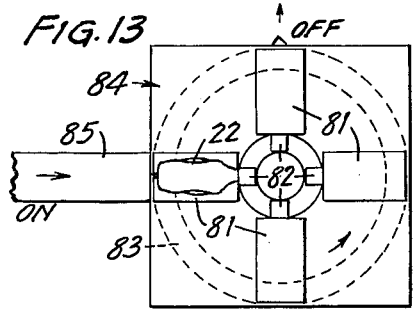
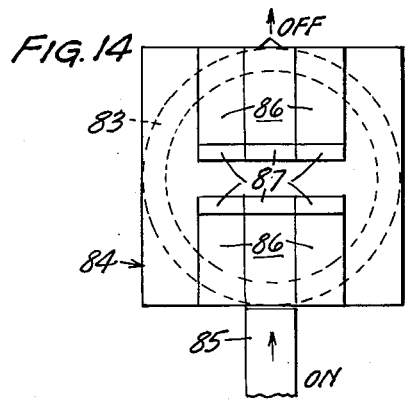
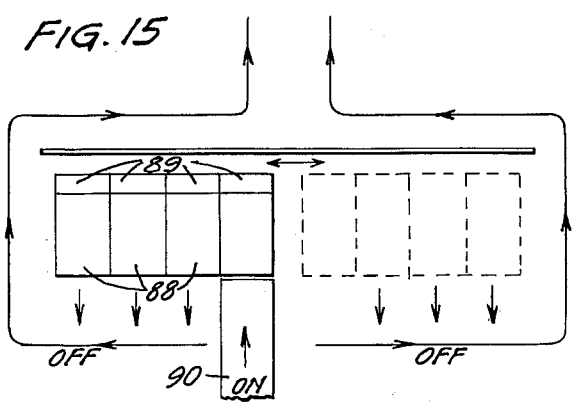
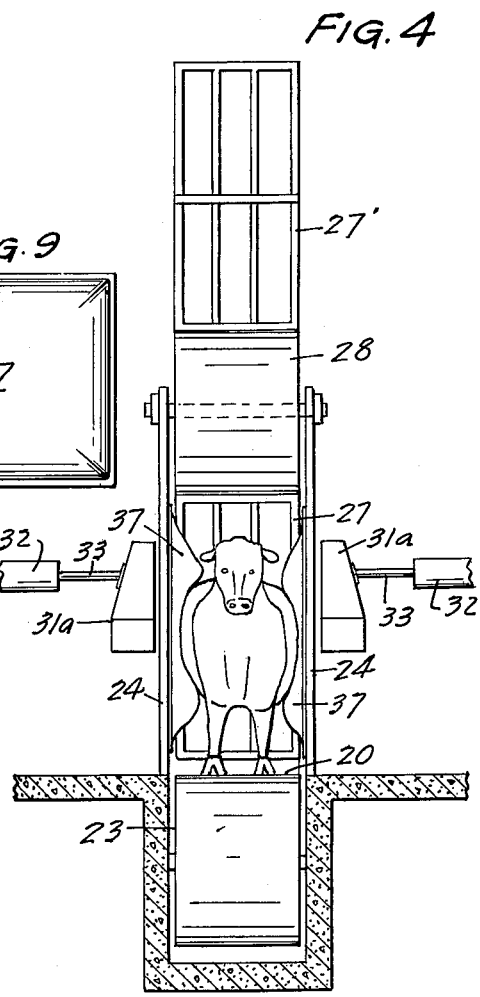
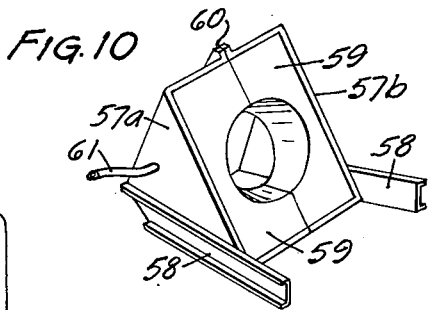
INVENTORS
LAURENCE W. MURPHY
CHRISTIAN D. MACY
BY Williamson & Palmatier
ATTORNEYS June 2, 1964 L. W. MURPHY ETAL 3,135,017
METHOD OF PREPARING ANIMALS FOR SLAUGHTER
Filed Aug. 30, 1960 4 Sheets-Sheet 3
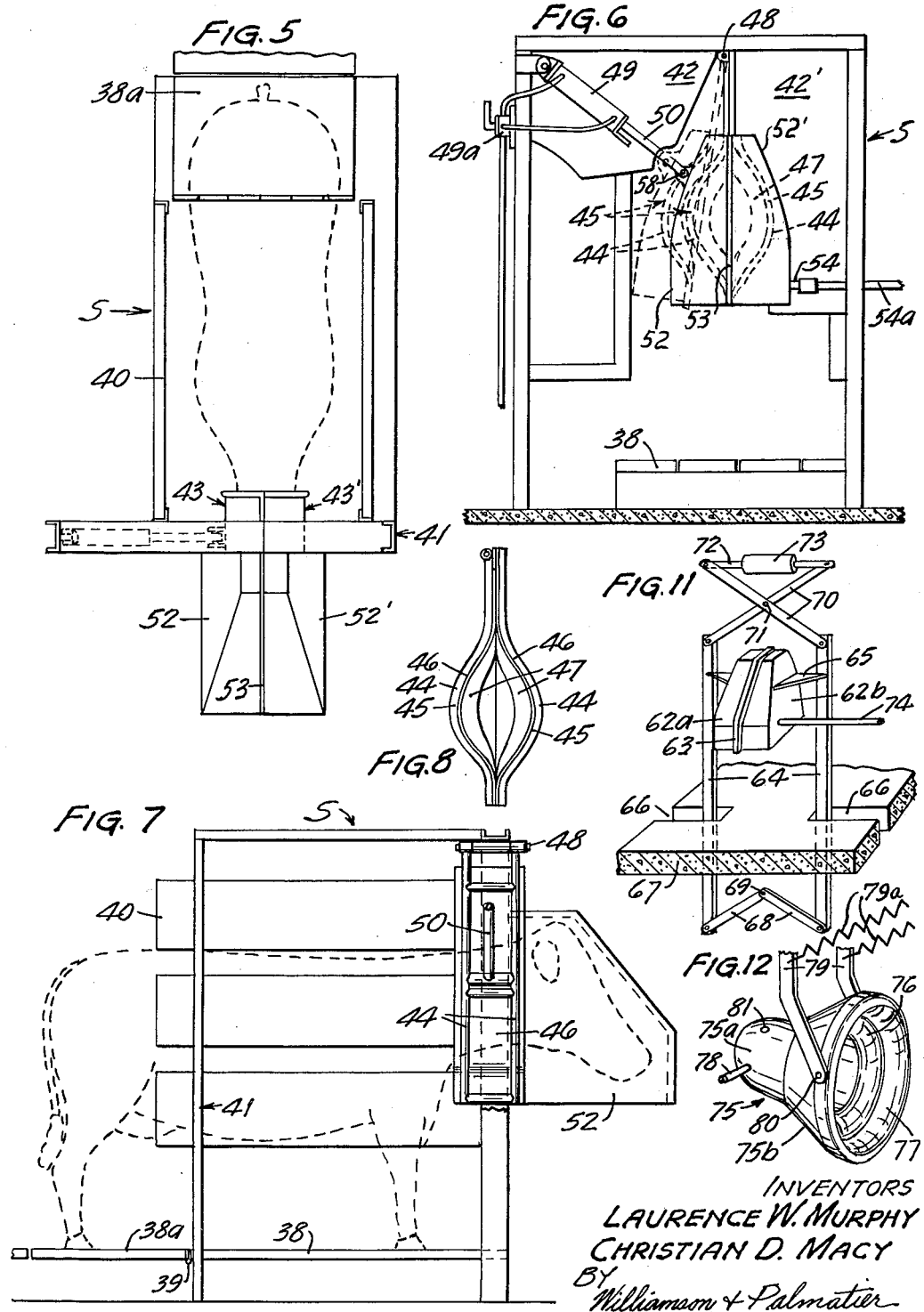
INVENTORS
LAURENCE W. MURPHY
CHRISTIAN D. MACY
BY Williamson + Palmatier
ATTORNEYS June 2, 1964   L. W. MURPHY ETAL   3,135,017
METHOD OF PREPARING ANIMALS FOR SLAUGHTER
Filed Aug. 30, 1960   4 Sheets-Sheet 4

INVENTORS
LAURENCE W. MURPHY
CHRISTIAN D. MACY
BY Williamson & Palmatier
ATTORNEYS

United States Patent Office 3,135,017
Patented June 2, 1964

3,135,017
METHOD OF PREPARING ANIMALS FOR SLAUGHTER
Laurence W. Murphy and Christian D. Macy, Austin, Minn., assignors to Geo. A. Hormel & Co., Austin, Minn., a corporation of Delaware
Filed Aug. 30, 1960, Ser. No. 52,984
6 Claims. (Cl. 17—45)

This invention relates to novel methods and apparatus for restraining and immobilizing large slaughter animals such as cattle, sheep and the like prior to their being bled and butchered.

In slaughtering animals, particularly cattle, it has been common practice over the years to confine the animals in a declined lane, and by the use of prodders and gates, urge the animals successively to a "stunning" station, where the animals are desensitized. This desensitization has been accomplished by manually forcefully hitting the top of the skull of the animal with a heavy sledge, or, as in more recent years, mechanical "stunners" resembling miniature pneumatic or hydraulic pile drivers, and cartridge or electric type stunners have in many instances replaced the human sledge wielders. Oftentimes the head of the animal is not maintained in a sufficiently stationary position, the result being that the animal frequently shifts its head during the stunning operation, causing inaccurate application of the stunning device, repetition of the stunning operation, and suffering on the part of the animal.

Therefore, an important object of this invention is novel methods and apparatus for restraining and immobilizing large slaughter animals in a more controlled manner than has been possible with methods and apparatus presently and previously available.

Another object is novel methods and apparatus for restraining and immobilizing slaughter animals which are more efficient and humane and considerably less messy than conventional methods and apparatus which include killing the animals by knocking their brains out manually with sledge hammers or with mechanical sledges or pile drivers, or by electric stunning.

Still another object is a novel immobilizing method and apparatus which permit the animals to be rapidly immobilized in rapid succession, either continuously or intermittently, individually or simultaneously.

Still another object is novel apparatus for comfortably restraining and positioning the animals in a stationary condition prior to their being rendered senseless by the novel means of this invention or by other means such as electric stunning or cartridge captive bolt.

Still another object is novel means for immobilizing slaugther animals by anesthetizing them quickly in a gaseous atmosphere such as carbon dioxide and then removing them for bleeding and butchering.

Still another object is novel hood means and methods of operating same for application to the head of slaughter animal to quickly anesthetize the animals in rapid succession to facilitate the immobilizing operation.

Still another object are novel stanchions for restraining the slaughter animals in comfortable humane fashion immediately prior to and during the desensitizing operation, which stanchions also are adapted to facilitate the removal of the immobilized or desensitized animal therefrom.

A further object is a novel combination of restraining and anesthetizing apparatus working in conjunction with one another to quickly, efficiently and humanely fix the head of the slaughter animal in a stationary position and enclose at least the nose portion of the head of the animal for receiving a charge of gas to quickly anesthetize the animal.

A still further object is novel immobilizing means for slaughter animals employing a conveyor system in conjunction with restraining and desensitizing apparatus for moving the animals successively or a plurality of them simultaneously through an desensitizing cycle of operation.

These and other objects and advantages of this invention will more fully appear from the following description made in connection with the accompanying drawings wherein like reference characters refer to the same or similar parts throughout the several views, and in which:

FIG. 1 is a side elevation in somewhat diagrammatic form of one form of immobilizing apparatus of this invention;

FIG. 2 is a top plan view of FIG. 1;

FIG. 3 is a transverse section taken along the line 3—3 of FIG. 2;

FIG. 4 is a front elevational view of FIG. 2 on an enlarged scale with the hood open;

FIG. 5 is a plan view of another form of this invention;

FIG. 6 is a front elevational view of FIG. 5.

FIG. 7 is a side elevational view of FIG. 5;

FIG. 8 is a front elevational view of the restraining collars of FIGS. 5–7 minus the hood sections;

FIG. 9 is a detail front elevational view of one form of animal restraining means;

FIG. 10 is a detail view of a nose cup employed in this invention;

FIG. 11 is a perspective view of an alternate form of hood and supporting mechanism therefor;

FIG. 12 is a detail perspective view on an alternate form of nose cup;

FIGS. 13, 14 and 15 are diagrammatic views of alternate methods of immobilizing the animals;

Figure 16:
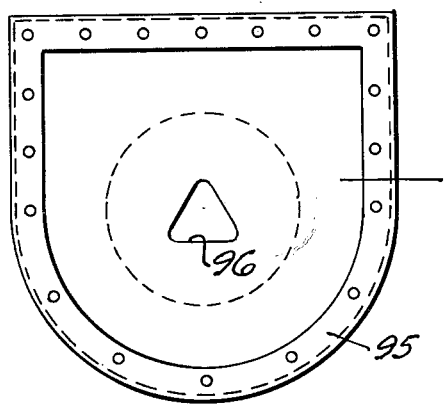
FIGS. 16 and 17 are rear and side elevational views respectively of still another immobilizing mask of this invention.

Reference is now made to the accompanying drawings for a more detailed description of the various methods and apparatus constituting preferred embodiments of this invention.

Referring first to the form of invention shown in FIGS. 1 through 4 inclusive, the apparatus shown in these figures includes a lower endless conveyor 20 mounted on a suitable supporting structure 21 upon which the slaughter animals 22 are to be conveyed through the immobilizing operation. The endless conveyor 20 is trained about suitable pulleys 23 and in the form shown is adapted to be moved intermittently from left to right by any suitable conventional drive means, not shown. The conveyor 20 is enclosed on each side by upstanding vertical wall structure or fences 24 for confining and maintaining the cattle on the conveyor. A gang way or feed way 25 enclosed by suitable fence structure 26 is provided at the entrance to the conveyor 20 to enable the cattle to successively file one behind the other from storage pens to the conveyor. As the cattle step onto the conveyor 20, they are separated from the animals immediately preceding and following them by depending gate type separator members 27 which are suspended from an endless overhead conveyor or belt 28 which is trained about suitable drive pulleys 29 and synchronized for simultaneous movement with the lower conveyor 20. The animals in progressing along the conveyor 20 pass through five successive stages or locations as shown in the drawings which are successively designated by the letters A, B, C, D, and E. Thus, initial position A shows the animal immediately upon entering the conveyor 20 prior to the separator gate 27' swinging down behind the animal to confine the animal on the conveyor both front and back as shown in position B.

The animal progresses from the intermediate position B to the immobilizing position C. At this position a pair of oppositely disposed laterally extending alcoves or compartments 30 are provided which are adapted to house the hood members 31a in the retracted position as shown by the broken line position in the drawings, together with the piston type hydraulic or pneumatic motors 32 which are adapted to extend and retract the hood members or sections 31a to which they are connected by means of piston connecting rods 33 and which may be operated either automatically or manually in any conventional manner desired and are supplied with air or fluid from a supply tank 32a. Thus, when the animal is moved by the conveyor to the immobilizing station C, the hydraulic cylinders or motors 32 are actuated to move the hood members 31a from their retracted broken line position to the solid line position in which they engage one another to form a composite hood unit 31 which encloses the head of the animal to be immobilized. Anesthetizing gas such as carbon dioxide is then caused to flown into the hood 31a through a suitable flexible conduit 34 connected to any suitable tank of gas 35 to anesthetize the animal. The anesthetizing gas may be in gaseous form as it enters the hood or it may be charged in liquid form under pressure which immediately returns to gaseous form in the hood. The period of time required for this anesthetizing operation is very short and on the order of fifteen seconds and as soon as it has been accomplished the hood sections 31a are immediately withdrawn from engagement with one another to their retracted broken line position in the compartments or alcoves 30, whereupon the anesthetized animal collapses upon the conveyor and assumes and is moved to the position D, the movement of the conveyor thereby bringing the next succeeding animal from position B to the immobilizing station C where the immobilizing operation is again repeated. Upon the next indexing to the conveyor 20, the collapsed animal moves from collapsed position D to the discharge end or position E where suitable shackle means 36 are secured to the hindquarters of the animal and the hoist chain 36a connected thereto and to suitable hoist mechanism not shown, lifts the anesthetized animal from the conveyor 20 and conveys the animal to the next slaughter house operation to be performed which is usually the bleeding or sticking of the animal.

FIGS. 5, 6, 7 and 8 illustrate another form of our invention employing a somewhat different stanchion structure and a novel anesthetizing hood structure in combination therewith. The immobilizing apparatus shown in FIGS. 5 through 8 inclusive includes a stanchion S having an animal supporting platform or floor 38, the rear portion 38a of which extends rearwardly behind the main body portion of the stanchion and which is hingedly mounted as at 39 to enable the platform section 38a to be automatically dropped down to facilitate shackling of the hindquarters of the animal after the anesthetizing operation has been completed and hoisting the animal out of the stanchion. The stanchion also includes upstanding confining side walls 40 mounted on a rigid supporting frame 41. The leading end of the stanchion frame 41 has mounted thereon abutment and supporting plates 42 and 42' disposed in a generally vertical plane transversely of said stanchion.

A pair of similar wide cooperating animal restraining neck confining jaws or clamping units 43 and 43' are suspended from the frame 41 in general alignment with the center line of the stanchion. Each of the jaw or clamping units 43 and 43' include a supporting frame 44 having an outwardly curved concave neck receiving and clamping enlarged curved portion 45. The frames 44 have mounted thereon suitable arcuate flanged collar sections 46, each of which is preferably lined with a resilient rubber cushion or lining 47 for securely enclosing and grasping a substantial portion of the neck of the animal without hurting or damaging same and also providing a more effective seal for the anesthetizing hood hereinafter to be described. In the form shown, one of the jaw or clamping units 43' is stationary or fixed and held against movement by the plate 42'. The opposite jaw or clamping unit 43 is swingably mounted from a pivot or hinge connection 48 for swinging movement towards and away from its opposing cooperating unit 43'. To provide this swinging movement and actuate the movable unit 43, a pneumatic or hydraulic cylinder or motor 49 is mounted on the stanchion frame 41 and has a connecting rod 50 hingedly connected at its outer end to the frame 44 of jaw unit 43 as at 51 and suitable valve control means 55. Thus, by actuating the motor provided by the cylinder 49 and connecting rod 50, the movable jaw or clamping unit 43 may be swung into cooperative engagement with its opposing unit 43' to securely and comfortably clamp substantially all of the neck of the animal therebetween and restrain the animal from movement during the anesthetizing operation and it may readily be swung away from cooperative engagement with the opposing member 43' upon completion of the anesthetizing operation to permit the anesthetized animal to collapse to the platform below and be removed therefrom.

To accomplish the anesthetizing, a pair of similar hood sections 52 and 52' are mounted on their respective clamping units 43 and 43' so as to move into and out of cooperative relationship with each other simultaneously with the relative movements between the clamping units 43 and 43'. Thus, the hood section 52 is swingable while the hood section 52' is fixed or stationary. A sealing gasket 53 is provided between the opposing cooperating faces or edge portions of the hood sections 52 and 52' and carried by one of said sections to seal the composite hood formed by the sections 52 and 52' and prevent escape of gas therefrom. A gas inlet 54 is provided on one of the hood sections 52' to which is connected a suitable gas line 54a and source of anesthetizing gas (not shown).

In operation, the jaw or clamp unit 43 and the hood section 52 carried therewith are initially swung to the open position shown by the broken line position in the drawings and the animal is urged forwardly into the stanchion until the neck portion of the animal is disposed opposite the curved portion 45 of the stationary clamp unit 43' and the head of the animal is in alignment with the hood section 52'. The motor 49 is then actuated, causing the connecting rod 50 to extend and swing the movable clamp unit 43 and the corresponding hood section 52 downwardly into engagement with the animal and to cooperate with the opposing clamping unit 43' and stationary hood section 52' to securely clamp the animal in the cushioned collar and prevent movement thereof and to confine the head of the animal within the hood so that the gas injected into the hood through the inlet 54 may quickly anesthetize the animal. It will be noted that the leading edges of the flanged collars 46 preferably are disposed immediately behind and contiguous to the jaws of the animal confined therebetween and extend rearwardly therefrom so as to span substantially the entire neck length of the animal, thereby substantially completely immobilizing the head and neck portion of the animal during the desensitizing thereof. A releasable clamp may also be provided for drawing the opposing faces or edges of the hood members together to insure a tight seal therebetween.

It will be appreciated and understood that either the clamping cushioned collar and the hood structure or both shown in FIGS. 5, 6, 7 and 8 may be interchangeably employed with the arrangement hereinbefore described in FIGS. 1 through 4.

To restrain the animal during immobilization and hold the same stationary to prevent movement thereof during the anesthetizing operations, we have provided novel, humane and comfortable restraining means illustrated in FIG. 9, which in the form shown consists of inflatable and deflatable air cushions 37 which are mounted on the inner side of the walls W of a stanchion or stall, which air cushions are adapted to substantially enclose and encompass both sides of the animal in the stall. Thus, as the animal moves into the stall the cushions 37 are in deflated condition to enable the animal to be properly positioned therebetween. When the animal has been properly positioned therebetween, the air cushions 37 are inflated, causing the same to expand and engage and press against the sides of the animal and conform to the body contours thereof, holding the animal comfortably but securely therebetween and thereby preventing movement of the animal during the immobilizing desensitizing or anesthetizing thereof while holding the animal very comfortably and without causing any pain thereto. A stanchion employing these novel restraining cushions may be employed in combination with any of the anesthetizing hood apparatus or conveyor systems disclosed herein, and may be utilized in combination with any type of desensitizing means desired.

FIG. 10 illustrates a modified form or alternate form of hood arrangement suitable for use in the structure shown in FIGS. 5 through 8 inclusive as a replacement for the hood structure consisting of hood sections 52 and 52' shown therein. In the arrangement shown in FIG. 10 the hood consists of a dual section nose cup consisting of the identical hood nose cup sections 57a and 57b. These sections in the form shown are adapted for interconnection with a neck clamping arrangement similar to that disclosed in FIGS. 5 through 8 and hereinabove described. The nose cup sections are connected to the clamping units by means of the forwardly extending diagonally disposed supporting arms 58 which are connected at their inner ends to the clamping units and have the nose cup sections mounted thereon adjacent their outer ends. The nose cup sections 57a and 57b are adapted to be moved into cooperative opposing alignment with one another so as to enclose the forward end or muzzle portion of the head of the animal instead of enclosing the entire head as in the form shown in FIGS. 5 through 8. The upper inner end portions of the nose cups are provided with soft rubber cushions 59 which are adapted to be pressed against the sides of the muzzle to seal the same to prevent the escape of the anesthetizing gas from the nose cup without inflicting pain on the animal prior to the anesthetizing. The opposing nose cup sections are provided with an intermediate gasket 60 for completing the seal therebetween and one of the nose cup sections is provided with a gas inlet 61 for injecting a stream of anesthetizing gas such as carbon dioxide into the nose cup to anesthetize the animal. Except for the difference in actual design and structure between the nose cup and the hood of FIGS. 5 to 8 inclusive, the two operate in all respects identically to the manner of operation above described for the structure shown in FIGS. 5 to 8 inclusive.

FIG. 11 illustrates still another form of our invention and particularly to a novel means for supporting the hood and moving the same into and out of operational engagement. In the form shown in FIG. 11, the hood sections 62a and 62b having an intermediate soft gasket 63 therebetween are mounted on vertically disposed supporting standards 64 by means of suitable mounting brackets 65. The standards 64 are mounted for movement in the slots 66 provided in the animal supporting platform 67 and are preferably adapted for vertical adjustment to conveniently accommodate the hood to the individual height characteristics of the animal being anesthetized. The standards 64 are linked together at their lower end portions by means of links 68 which are pivotally connected to the standards at their outer ends and are pivotally connected to one another as at 69 at their inner ends. The standards 64 are adapted to be moved away from and towards one another to open and close the hood by means of a pair of crossed links or lever arms 70 which are pivotally connected to the standards at their lower ends and are pivotally connected to one another at their point of intersection 71 and are pivotally connected at their upper ends to the piston rods 72 of a double acting hydraulic or pneumatic cylinder 73. Thus, when the piston rods 72 are extended, they operate to cause the standards 64 to move away from one another to spread or open the distance therebetween and open the hood to enable the head of the animal to be inserted therein or removed therefrom. Upon contractive or retractive movement of the rods 72 the lever arms 70 are drawn towards vertical alignment with one another causing the standards 64 to be drawn together to bring the hood sections 62a and 62b into cooperative engagement with one another to confine the head of the animal therebetween to permit the animal to be anesthetized by gas which is injected into the hood through the inlet 74.

FIG. 12 illustrates still another form of our invention employing a novel nose piece or cup for enclosing the muzzle of the animal to anesthetize the same and which may be employed as a substitute for the hood arrangement shown in FIGS. 5 through 9. In the form shown in FIG. 12, the nose cup 75 includes a forwardly directed rounded nose enclosing shell portion 75a and an enlarged flaring rear portion 75b. The enlarged rear portion 75b is lined with a pair of inflated annular tubes 76 and 77 of different diameters which are softly resilient and adapted to enclose the muzzle of the animal and seal the same to prevent the escape of anesthetizing gas therefrom. The different sized tubes are provided to enable the nose piece to be used on animals having different sized muzzles. The nose portion 75a is provided with a gas inlet 78. The nose piece 75 is pivotally mounted on and suspended from a suitable overhead support by means of a forked supporting member having bent arms 79 which is pivotally mounted for swinging motion towards and away from the head of the animal to mount and demount the same thereon. The nose piece 75 is pivotally mounted on the forked supporting member 79 as at 80 for swinging movement relative thereto about a generally horizontal axis to enable the nose piece to be adjustable as to angularity to adjust to the individual characteristics of the animal being anesthetized.

In use, the cattle are first driven into the stanchion, and the neck gripping jaws or clamps are brought together around its neck to hold the animal in a stationary position and prevent its withdrawal therefrom. The nose piece 75, which is hanging directly in front of the animal's nose, is slipped into said nose in snug fitting relationship therewith to confine the nose of the animal in the sealed anesthetizing chamber provided, the nose piece being adjustable to the proper angle and held on the nose either positively or by means of springs 79a. As the nose piece is fitted on the muzzle, the anesthetizing gas is introduced into it through line 78, the air present in the interior of the nose piece being expelled therefrom through a small escape hole or vent 81 by the incoming gas. Although not shown in the drawings the nose piece and forked arm may be positioned against the face of the animal by any conventional means such as an air cylinder or the like. When the anesthetizing has been completed, the animal collapses and is released from the clamping and hood mechanism, the nose piece and supporting arm, permitting the cattle to collapse and free to be shackled and hoisted out of the stanchion unto a sticking conveyor.

FIGS. 13, 14 and 15 somewhat diagrammatically illustrate alternate arrangements for separating and substantially continuously and rapidly conveying animals through an anesthetizing and immobilizing operation to enable a large number of animals to be slaughtered in the shortest time possible and in a humane manner.

In the arrangement shown in FIG. 13 a series of individual immobilizing units consisting of radially extending circumferentially spaced stalls or stanchions 81 and anesthetizing hoods 82 are mounted on a turntable 83 which in turn is mounted on a suitable supporting structure 84 and provided with suitable drive mechanism (not shown) for rotating the turntable in the direction of the arrows shown in the drawings which in FIG. 13 is counter-clockwise. In the form shown the animals successively enter the immobilizing units from the chute 85 at the position marked "On" where they are immediately restrained in the stall or stanchion by any of the restraining means disclosed hereinabove and are rendered senseless as by anesthetizing by any of the hood structures also disclosed hereinabove during their stay on the turntable. The stalls are repeatedly rotated and indexed by the turntable until they reach the discharge station marked "Off" where they are removed by any suitable shackle or hoist mechanism and are then indexed back to the entrance station or "On" position where the cycle is again repeated. The movement of the turntable may be slowly continuous or intermittent as desired.

FIG. 14 illustrates another alternate form of separating the animals and rapidly conveying them through an immobilizing operation in a manner similar to that just described, with the exception that the individual immobilizing units are arranged somewhat differently from that shown in FIG. 13 on the turntable. Thus, the immobilizing units consisting of the restraining stalls or stanchions 86 and hood units 87 are grouped in parallel side-by-side fashion on opposite sides of the turntable 83. In FIG. 14 two diametrically opposed groups of three immobilizing units each are shown. The cattle enter the stalls from the "On" position from chute 85, and after the stalls are filled they are rotated to the opposite or "Off" side, the animals being rendered senseless as by anesthetizing during their travel from the "On" to the "Off" position. When the desensitized animals and their respective stalls reach the opposite or "Off" side, the animals are shackled by any suitable means and hoisted from the stalls, the empty stalls then being indexed back to the "On" position for receiving more animals to be desensitized.

FIG. 15 illustrates still another arrangement for conveying the slaughter animals through an immobilizing cycle of operation, in which the immobilizing units are alternately reciprocated linearly through a cycle of operation rather than through a rotary cycle as in FIGS. 13, and 14. In FIG. 15, individual immobilizing units consisting of the stalls 88 and hood units 89 are mounted in parallel side-by-side relationship for simultaneous reciprocating or alternating back and forth movement between the solid line to the broken line position by suitable mechanism (not shown). Thus, the animals are fed to the stalls at the "On" position through chute 90 as the stalls are successively indexed therepast. When the grouped stalls carrying the animals to be immobilized reach the end of their travel in any given direction, the desensitization of the animals is completed, and the animals are shackled and removed from the stalls at the "Off" positions. The stalls may be refilled as they file past the chute 90 on their return trip and the animals desensitized and removed from the opposite side of the chute 90 at the "Off" positions, or the grouped stalls may be returned to their original position empty to be filled when traveling in one direction only. Thus, the group of four stalls shown in FIG. 15 may be filled only when traveling from left to right (or from the solid to broken line position) as they are indexed past chute 90, and removed on the right side of the chute 90. Each of the stalls may then be refilled as they return past the chute 90 as they move from right to left, the animals being quickly desensitized and removed from the left side of chute 90 when the stalls have completed their travel towards the left, or the entire group may be quickly returned to the solid line position and filled only when going towards the right and shackled and removed only on the right hand side, whichever is considered most preferable under existing circumstances.

Figure 17:
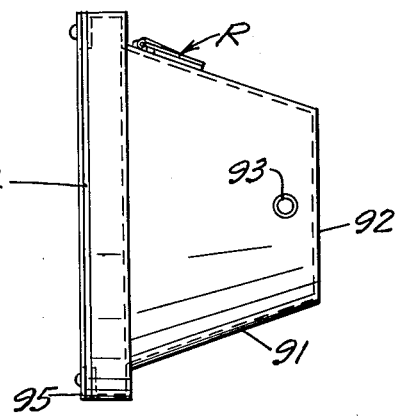
Figure 18:
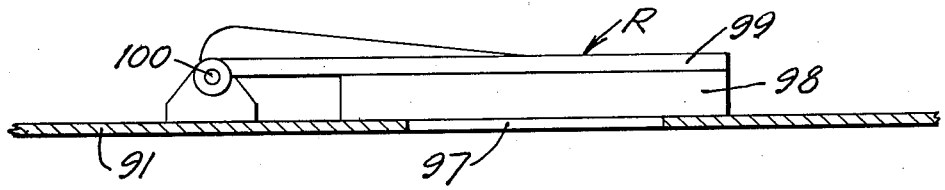
FIG. 18 is a detail view on an enlarged scale of the relief valve of the mask shown in FIGS. 16 and 17.

FIGS. 16, 17 and 18 illustrate another novel and particularly effective immobilizing mask which can be utilized in combination with the other immobilizing apparatus disclosed herein. The mask comprises a conoidal hood 91, the forward end of which is closed by the end wall 92, with a gas inlet 93 for admitting anesthesizing gas to the interior thereof. The back of the hood is substantially completely enclosed by a diaphragm 94 of suitable resilient material such as rubber, the diaphragm being secured to the hood by means of a retaining ring 95. A generally triangular shaped hole 96 is formed in the central portion of the diaphragm through which the animal inserts its muzzle and face, the material surrounding the hole stretching over and around the face of the animal and effectively sealing the hood.

A relief valve, indicated generally by the letter R, is provided in the top of the hood which is designed to actuate or open when the animal being immobilized exhales. The valve includes an escape opening 97 in the top of the hood, which opening is normally closed and sealed by a cover 98 preferably made of resilient sealing material such as rubber which cover is carried by a flap 99 hingedly mounted on the hood as at 100, the cover being normally sealingly held against the hood and over the opening 97 by gravity. However, the cover and its flap are capable of rising sufficiently for a moment to permit the escape of excess gas in the hood when the animal exhales.

It can readily be appreciated from the foregoing description that we have devised novel means for quickly, accurately and humanely immobilizing slaughter animals and rapidly moving them through an immobilizing cycle of operation. Thus, the various arrangements shown in FIGS. 1, 13, 14 and 15 permit the animals to be successively led to a conveyor system provided with suitable restraining and desensitizing mechanism, which conveyor system carries the animals through the immobilizing or desensitizing cycle and discharges the desensitized animals for delivery to the next slaughter operation, which is usually the sticking and bleeding operation.

Those familiar with slaughter house operations will also appreciate the neatness, efficiency, humane effectiveness and speed of operation made possible by the novel methods and apparatus disclosed herein.

Thus, the combination of a conveyor system with immobilizing or desensitizing means, and particularly with the novel restraining apparatus and anesthetizing apparatus disclosed herein, constitutes a material advance in slaughter house operations over those presently and previously known and practiced.

It will also be understood that the various restraining and anesthetizing apparatus disclosed herein may be interchangeably employed with each other and with the alternate conveying systems also set forth herein in a manner most suitable to the particular installation.

It will further be noted that the novel methods disclosed herein provide means for stationary, circular and lineal immobilizing to facilitate adaption to almost every type of situation possible.

It will, of course, be understood that various changes may be made in the form, details, arrangement and proportions of the various parts without departing from the scope of our invention.

What we claim is:
1. A method of preparing animals for slaughter consisting in
conveying and confining an animal for movement along a predetermined path of travel to a discharge station, immobilizing the head of said animal while being conveyed,
enclosing at least the nose of said immobilized animal and subjecting the animal to an anesthetizing gas to thereby desensitize the same,
releasing the head of the desensitized animal,
and conveying the desensitized animal to said station,
and discharging said immobilized animal from said conveyor for delivery to the next slaughtering operation.

2. The method as defined in claim 1 wherein said movement of the animal along the predetermined path of travel is temporarily interrupted during the head immobilizing and anesthetizing steps.

3. The method as defined in claim 1 wherein said path of movement is in a circular direction.

4. The method as defined in claim 3 wherein the discharge station is located approximately 270 degrees from that point wherein the animals are initially confined.

5. The method as defined in claim 3 wherein the discharge station is located approximately 180 degrees from that point wherein the animals are initially confined.

6. The method as defined in claim 1 wherein each of the animals is rectilinearly conveyed from a loading station a predetermined distance during the immobilization and anesthetizing operations, and are thereafter reciprocably returned to the loading station for discharge therefrom.

References Cited in the file of this patent

UNITED STATES PATENTS

| | | |
|---|---|---|
| 1,753,851 | Dever | Apr. 8, 1930 |
| 2,275,534 | Langsdorf | Mar. 10, 1942 |
| 2,526,037 | Murphy | Oct. 17, 1950 |
| 2,733,477 | Murphy | Feb. 7, 1956 |
| 2,841,142 | Hay | July 1, 1958 |
| 2,895,164 | Murphy | July 21, 1959 |
| 2,912,715 | Moss | Nov. 17, 1959 |
| 2,978,737 | Hughes | Apr. 11, 1961 |
| 2,979,762 | Schulz | Apr. 18, 1961 |

FOREIGN PATENTS

| | | |
|---|---|---|
| 75,595 | Denmark | Mar. 16, 1953 |
| 424,443 | Germany | Jan. 25, 1926 |